(12) United States Patent
Namazue et al.

(10) Patent No.: US 11,422,325 B2
(45) Date of Patent: Aug. 23, 2022

(54) OPTICAL FIBER RIBBON AND OPTICAL FIBER CABLE HOUSING OPTICAL FIBER RIBBON

(71) Applicants: FUJIKURA LTD., Tokyo (JP); NIPPON TELEGRAPH AND TELEPHONE CORPORATION, Tokyo (JP)

(72) Inventors: Akira Namazue, Tokyo (JP); Ken Osato, Sakura (JP); Naoki Okada, Yotsukaido (JP); Yusuke Yamada, Tsukuba (JP); Daisuke Kakuta, Tsukuba (JP); Hisaaki Nakane, Tsukuba (JP); Shinya Hamaguchi, Tsukuba (JP)

(73) Assignees: FUJIKURA LTD., Tokyo (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/825,336

(22) Filed: Mar. 20, 2020

(65) Prior Publication Data

US 2020/0218020 A1 Jul. 9, 2020

Related U.S. Application Data

(60) Continuation of application No. 15/401,336, filed on Jan. 9, 2017, now abandoned, which is a division of
(Continued)

(30) Foreign Application Priority Data

Oct. 18, 2011 (JP) .................................. 2011-229066

(51) Int. Cl.
*G02B 6/44* (2006.01)
*G02B 6/25* (2006.01)
(Continued)

(52) U.S. Cl.
CPC ......... *G02B 6/4404* (2013.01); *G02B 6/2551* (2013.01); *G02B 6/2555* (2013.01);
(Continued)

(58) Field of Classification Search
CPC ................ G02B 6/4404; G02B 6/2551; G02B 6/4403; G02B 6/441; G02B 6/00
(Continued)

(56) References Cited

U.S. PATENT DOCUMENTS 4,350,867 A * 9/1982 Kinoshita ............ G02B 6/2551
219/121.63
4,547,040 A 10/1985 Yamamoto
(Continued)

FOREIGN PATENT DOCUMENTS

CN 1217071 A 5/1999
CN 101910901 A 12/2010
(Continued)

OTHER PUBLICATIONS

Office Action from the Brazilian Intellectual Property Office for corresponding BR patent application No. BR112014009570-1 dated Mar. 13, 2020.
(Continued)

*Primary Examiner* — Kaveh C Kianni
(74) *Attorney, Agent, or Firm* — Dority & Manning, P.A.

(57) ABSTRACT

Provided is an optical fiber ribbon capable of achieving higher density and reduction in diameter and accurately placing optical fibers in V-shape grooves in a fusion machine without failure. The optical fiber ribbon 1 includes three or more of optical fibers 2 arranged in parallel and connecting portions 3 connecting adjacent two optical fibers 2 together, the connecting portions 3 being intermittently provided in each of a ribbon longitudinal direction and a ribbon width direction. The connecting portions 3 are each formed in such
(Continued)

a manner as to fill resin into a gap S formed between adjacent two optical fibers 2, and both surfaces of the respective connecting portions 3 are each formed into a recess having a concave shape curved toward a center of the gap S to separate from lines 4,5 each connecting contact points of the optical fibers 2 when being placed on a horizontal surface.

14 Claims, 6 Drawing Sheets

Related U.S. Application Data application No. 14/251,233, filed on Apr. 11, 2014, now abandoned, which is a continuation of application No. PCT/JP2012/076590, filed on Oct. 15, 2012.

(51) Int. Cl.
    *G02B 6/255*     (2006.01)
    *G02B 6/36*     (2006.01)

(52) U.S. Cl.
    CPC ........... *G02B 6/441* (2013.01); *G02B 6/4403* (2013.01); *G02B 6/443* (2013.01); *G02B 6/4405* (2013.01); *G02B 6/448* (2013.01); *G02B 6/4482* (2013.01); *G02B 6/3636* (2013.01); *G02B 6/4489* (2013.01)

(58) Field of Classification Search
    USPC .......................................................... 385/71
    See application file for complete search history.

(56) References Cited

U.S. PATENT DOCUMENTS

| | | | | | |
|---|---|---|---|---|---|
| 4,662,713 | A | * | 5/1987 | Davies | G02B 6/3636 385/71 |
| 4,730,198 | A | * | 3/1988 | Brown | G02B 6/3636 257/E27.133 |
| 4,789,214 | A | * | 12/1988 | Vilhelmsson | G02B 6/262 216/24 |
| 4,830,456 | A | * | 5/1989 | Kakii | G02B 6/3839 385/75 |
| 4,869,570 | A | * | 9/1989 | Yokohama | G02B 6/245 385/24 |
| 5,009,513 | A | * | 4/1991 | Onodera | G01K 17/003 156/158 |
| 5,024,505 | A | * | 6/1991 | Fujikawa | G02B 6/3801 385/97 |
| 5,100,219 | A | * | 3/1992 | Takahashi | G02B 6/2551 385/30 |
| 5,457,765 | A | * | 10/1995 | Suzuki | G02B 6/2551 385/137 |
| 5,627,930 | A | * | 5/1997 | Ishiguro | G02B 6/2821 385/43 |
| 5,706,380 | A | * | 1/1998 | Le Noane | G02B 6/3803 385/147 |
| 6,173,098 | B1 | | 1/2001 | Steijer | |
| 6,309,567 | B1 | * | 10/2001 | Okuno | C03C 25/18 118/405 |
| 6,368,441 | B1 | * | 4/2002 | Yamada | G02B 6/3628 156/178 |
| 6,421,493 | B1 | * | 7/2002 | Burek | G02B 6/3885 385/134 |
| 6,584,257 | B1 | * | 6/2003 | Hurley | G02B 6/4471 385/109 |
| 6,795,460 | B1 | * | 9/2004 | Itoh | H01S 3/06704 372/34 |
| 7,151,879 | B2 | * | 12/2006 | Ishikawa | G02B 6/4403 385/114 |
| 2002/0009271 | A1 | * | 1/2002 | Herve | G02B 6/2555 385/98 |
| 2002/0159727 | A1 | * | 10/2002 | Okada | G02B 6/4495 385/109 |
| 2003/0118301 | A1 | | 6/2003 | Hurley | |
| 2004/0131321 | A1 | * | 7/2004 | Kubo | G02B 6/262 385/124 |
| 2005/0041932 | A1 | * | 2/2005 | Benzoni | G02B 6/4283 385/88 |
| 2005/0141831 | A1 | * | 6/2005 | Bocanegra | G02B 6/443 385/100 |
| 2005/0207712 | A1 | * | 9/2005 | Saito | G02B 6/3803 385/95 |
| 2005/0226573 | A1 | * | 10/2005 | Okuno | G02B 6/02004 385/114 |
| 2006/0291793 | A1 | * | 12/2006 | Carpenter | G02B 6/30 385/137 |
| 2008/0056653 | A1 | * | 3/2008 | Sato | G02B 6/4403 385/114 |
| 2010/0296781 | A1 | * | 11/2010 | Sato | G02B 6/4495 385/114 |
| 2011/0110635 | A1 | * | 5/2011 | Toge | G02B 6/441 385/102 |
| 2016/0018593 | A1 | * | 1/2016 | Tasker | G01H 9/004 385/37 |
| 2016/0139333 | A1 | * | 5/2016 | Zhang | G02B 6/02214 385/124 |

FOREIGN PATENT DOCUMENTS

| | | | |
|---|---|---|---|
| CN | 102057309 A | | 5/2011 |
| JP | 1-138519 A | | 5/1989 |
| JP | 2-56510 A | | 2/1990 |
| JP | 4268522 A | | 9/1992 |
| JP | 06051150 A | * | 2/1994 |
| JP | 08-062476 A | | 3/1996 |
| JP | 08-220397 A | | 8/1996 |
| JP | 3058203 B2 | | 7/2000 |
| JP | 2003-232972 A | | 8/2003 |
| JP | 2003232972 | | 8/2003 |
| JP | 2005-017662 A | | 1/2005 |
| JP | 2005-43467 A | | 2/2005 |
| JP | 2005-062427 | | 10/2005 |
| JP | 2007-58206 A | | 3/2007 |
| JP | 2007-279226 A | | 10/2007 |
| JP | 2007279226 A | * | 10/2007 |
| JP | 4143651 B2 | | 9/2008 |
| JP | 2010-2743 A | | 1/2010 |
| JP | 2010-033010 A | | 2/2010 |
| JP | 2010-224478 A | | 10/2010 |
| JP | 2010-237292 A | | 10/2010 |
| JP | 2011-229066 A | | 11/2011 |
| KR | 10-2007-0010148 A | | 1/2007 |
| WO | WO2010/001663 A1 | | 1/2010 |
| WO | WO-2010001663 A1 | * | 1/2010 ........... G02B 6/4403 |

OTHER PUBLICATIONS

Communication dated Nov. 19, 2019 from the State Intellectual Property Office of the P.R.C. in application No. 201611198605.1.
Communication dated Oct. 1, 2019 by the Brazilian Patent Office in application No. BR112014009570-1.
Communication dated Jul. 9, 2019 issued by the China National Intellectual Property Administration in counterpart Application No. 201611199291.7.
Communication dated Jun. 27, 2019, from the State Intellectual Property Office if the P.R. of China in counterpart Application No. 201611198605.1.
Communication dated Apr. 18, 2019 from the Korean Intellectual Property Office in counterpart UAE Applicatinn No. UAE/P/382/2014.
Communication dated Feb. 28, 2019, from the European Patent Office in counterpart European Application No. 12842552.7.
CCITT; International Telecommunication Union; Series G. Transmission Systems and Media, Digital Systems and Networks; "Characteristics of a single-mode optical fibre cable" Reedition of CCITT Recommendation G.652; Published Nov. 1988 in Blue Book, Fascicle III.3; Printed in Geneva, Switzerland 2006.

(56) References Cited

OTHER PUBLICATIONS

Communication dated Dac. 4, 2018 from the State Intellectual Property Office of People's Republic of China in counterpart Application No. 201611199291.7.
Communication dated Jun. 28, 2018, issued by the Korean Intellectual Property Office in counterpart UAE Application No. 382/2014.
EP Office Action dated May 9, 2017 in counterpart EP Application No. 12 842 552.7-1562.
Communication dated Oct. 31, 2017 from the Intellectual Property Office of India in counterpart India application No. 3853/DELNP/2014.
Communication dated May 10, 2017, issued from the European Patent Office in counterpart European Patent Application No. 16204376.4.
Communication dated Apr. 6, 2017, from the State Intellectual Property Office of People's Republic of China in counterpart Application No. 201280051112.9.
Communication dated Aug. 6, 2015 from the KR Intellectual Property Office in counterpart application No. 10-2014-7012805.
Communication dated Jan. 28, 2016 from the KR Intellectual Property Office in counterpart application No. 10-2014-7012805.
Communication dated Jul. 16, 2015 from the TW Intellectual Property Office in counterpart application No. 101138424.
Communication dated Jul. 24, 2015 from the CA Intellectual Property Office in counterpart application No. 2851090.
Communication dated Mar. 15, 2016 from the State Intellectual Property Office of the P.R.C. in counterpart application No. 201280051112.9.
Communication dated Mar. 24, 2015, issued by the Taiwan Patent Office in corresponding application No. 101138424.
Communication dated May 22, 2015 from the JP Patent Office in counterpart application No. 2014-117800.
Communication dated May 27, 2015 from the EP Patent Office in counterpart application No. 12842552.7.
Onnmunication dated Nov. 1, 2016, from the State Intellectual Property Office of People's Republic of China in counterpart Application No. 201280051112.9.
Communication dated Oct. 14, 2015 from the RU Patent Office issued in corresponding application No. 2014119931.
Japanese Office Action for JP 2011-229066 dated Sep. 17, 2013.
Office Action dated Jan. 20, 2020 from the CN intellectual Property Office for corresponding patent application No. 201611199291.7.
Examination Report from the KR Intellectual Property Office for corresponding UAE patent application No. UAE/P/382/2014.

\* cited by examiner

OPTICAL FIBER RIBBON AND OPTICAL FIBER CABLE HOUSING OPTICAL FIBER RIBBON

CROSS-REFERENCE TO RELATED APPLICATION

This application is a continuation of U.S. patent application Ser. No. 15/401,336, filed on Jan. 9, 2017, which is a divisional of U.S. patent application Ser. No. 14/251,233, filed on Apr. 11, 2014, which is a continuation of PCT/JP2012/076590, filed on Oct. 15, 2012, which claims the benefit of priority to Japanese Patent Application No. 2011-229066, filed on Oct. 18, 2011, the disclosures of all of which are incorporated by reference herein in their entireties.

BACKGROUND OF THE INVENTION

The present invention relates to an optical fiber ribbon having an intermittent fixing structure in which adjacent optical fibers are intermittently connected together via connecting portions, and relates to an optical fiber cable housing the optical fiber ribbon.

There has been an increased demand for higher density and reduction in diameter in the technical field of optical fiber cables. As an example of a method for achieving higher density and reduction in diameter, there is proposed a method for reducing the outer diameter of optical fibers from 250 μm, which is a presently-used size, to 200 μm or smaller (for example, described in Japanese Patent No. 3058203 (Patent Literature 1). An optical fiber ribbon using this method has a structure in which a plurality of optical fibers each having the outer diameter of 200 μm or smaller are arranged in parallel, and the entire circumference of the optical fibers is covered with ultraviolet curable resin.

With the optical fiber ribbon described in Patent Literature 1, however, are intermediate branching operation is difficult when laying optical fibers into residences of subscribers. In order to lay the optical fibers into the residences of subscribers, a cover layer entirely covered with the ultraviolet curable resin is required to be removed in the middle of the cable so that particular optical fibers are only extracted from the plurality of optical fibers. Since the entire circumference of the plural optical fibers is covered with the ultraviolet curable resin, the removal of the ultraviolet curable resin is difficult and the particular optical fibers are not easily removed from the other optical fibers. Further, in the optical fiber ribbon described in Patent Literature 1, the entirely-covered cover layer increases the thickness of the optical fiber ribbon by the thickness of the cover layer, which decreases the packaging density thereof.

Japanese Patent No. 4113651 (Patent Literature 2) teaches an optical fiber ribbon capable of solving these problems. This optical fiber ribbon does not have a structure in which optical fibers are entirely covered with resin, but has an intermittent fixing structure in which adjacent two optical fibers of three or more of optical fibers arranged in parallel are connected together with resin. The intermittent fixing structure of the optical fiber ribbon described in Patent Literature 2 contributes easy intermediate branching operation and has the advantage of higher density since the number of connecting portions is smaller than that in the structure of Patent Literature 1.

SUMMARY

However, when the optical fiber ribbon described in Patent Literature 1 is fused and connected with another optical fiber ribbon, bare optical fibers (glass optical fibers) from which the cover layer made of resin is removed may be hard to be set in a fusion machine having plural V-shaped grooves formed at a predetermined pitch to be independently placed in the V-shaped grooves. Failure in placing the optical fibers in the V-shaped grooves in the fusion machine requires extra work to forcibly place the optical fibers in the V-shaped grooves.

An object of the present invention is to provide an optical fiber ribbon capable of achieving higher density and reduction in diameter and accurately placing optical fibers in V-shape grooves in a fusion machine without failure, and provide an optical fiber cable housing the optical fiber ribbon.

Claim 1 recites an optical fiber ribbon comprising three or more of optical fibers arranged in parallel and connecting portions connecting adjacent two optical fibers together, the connecting portions being intermittently provided in each of a ribbon longitudinal direction and a ribbon width direction, wherein a gap is formed between adjacent two optical fibers, the connecting portions are each formed in such a manner as to fill resin into the gap, and both surfaces of the respective connecting portions are each formed into a recess having a concave shape curved toward a center of the gap to separate from lines each connecting contact points of the optical fibers when being placed on a horizontal surface.

Claim 2 recites the optical fiber ribbon according to claim 1, wherein an outer diameter dimension of the optical fibers is set to smaller than or equal to 220 μm, and a distance between centers of the adjacent two optical fibers is set to 250 μm with a margin of plus or minus 30 μm.

Claim 3 recites the optical fiber ribbon according to claim 1, wherein an outermost layer of the respective optical fibers is colored.

Claim 4 recites an optical fiber cable housing the optical fiber ribbon according to claim 1 therein.

Claim 5 recites an optical fiber ribbon comprising three or more of optical fibers arranged in parallel and connecting portions connecting adjacent two optical fibers together, the connecting portions being intermittently provided in each of a ribbon longitudinal direction and a ribbon width direction, wherein a gap if formed between adjacent two optical fibers, the connecting portions are each formed in such a manner as to fill resin into the gap and cover a periphery of the respective optical fibers with the resin, and both surfaces of the respective connecting portions are each formed into a recess having a concave shape curved toward a center of the gap to separate from lines each connecting contact points of the optical fibers when being placed on a horizontal surface.

Claim 6 recites the optical fiber ribbon according to claim 5, wherein an outer diameter dimension of the optical fibers is set to smaller than or equal to 220 μm, and a distance between centers of the adjacent two optical fibers is set to 250 μm with a margin of plus or minus 30 μm.

Claim 7 recites the optical fiber ribbon according to claim 5, wherein a resin thickness of the periphery covered with the resin is set to smaller than or equal to 15 μm.

Claim 8 recites the optical fiber ribbon according to any one of claim 5, wherein an outermost layer of the respective optical fibers is colored.

According to the present invention, a reduction in diameter of the optical fibers is achieved and the optical fiber ribbon is easily bent due to the intermittent fixing structure thereof in which the connecting portions for connecting adjacent two optical fibers are intermittently provided in each of the ribbon longitudinal direction and the ribbon width direction and due to the reduced outer diameter dimension of the optical fibers which is set to smaller than or equal to 220 µm. As a result, a larger number of the optical fiber ribbons can be housed in the cable so as to improve the packaging density.

According to the present invention, the distance between the centers of adjacent two optical fibers is set to 250±30 µm, which is equal to a distance between the centers of adjacent two optical fibers of an optical fiber ribbon commonly distributed, so as to accurately place the respective optical fibers in the corresponding V-shape grooves in the fusion machine without falling out of the V-shaped grooves.

BRIEF DESCRIPTION OF DRAWINGS

FIG. 2(A) is a structural example of the connecting portion, and FIG. 2(B) is another structural example of the connecting portion.

FIG. 3(A) is a structural example of the connecting portion, and FIG. 3(B) is another structural example of the connecting portion.

DESCRIPTION OF EMBODIMENTS

Hereinafter, a specific embodiment of the present invention will be explained in detail with reference to the drawings.

Figure 1:
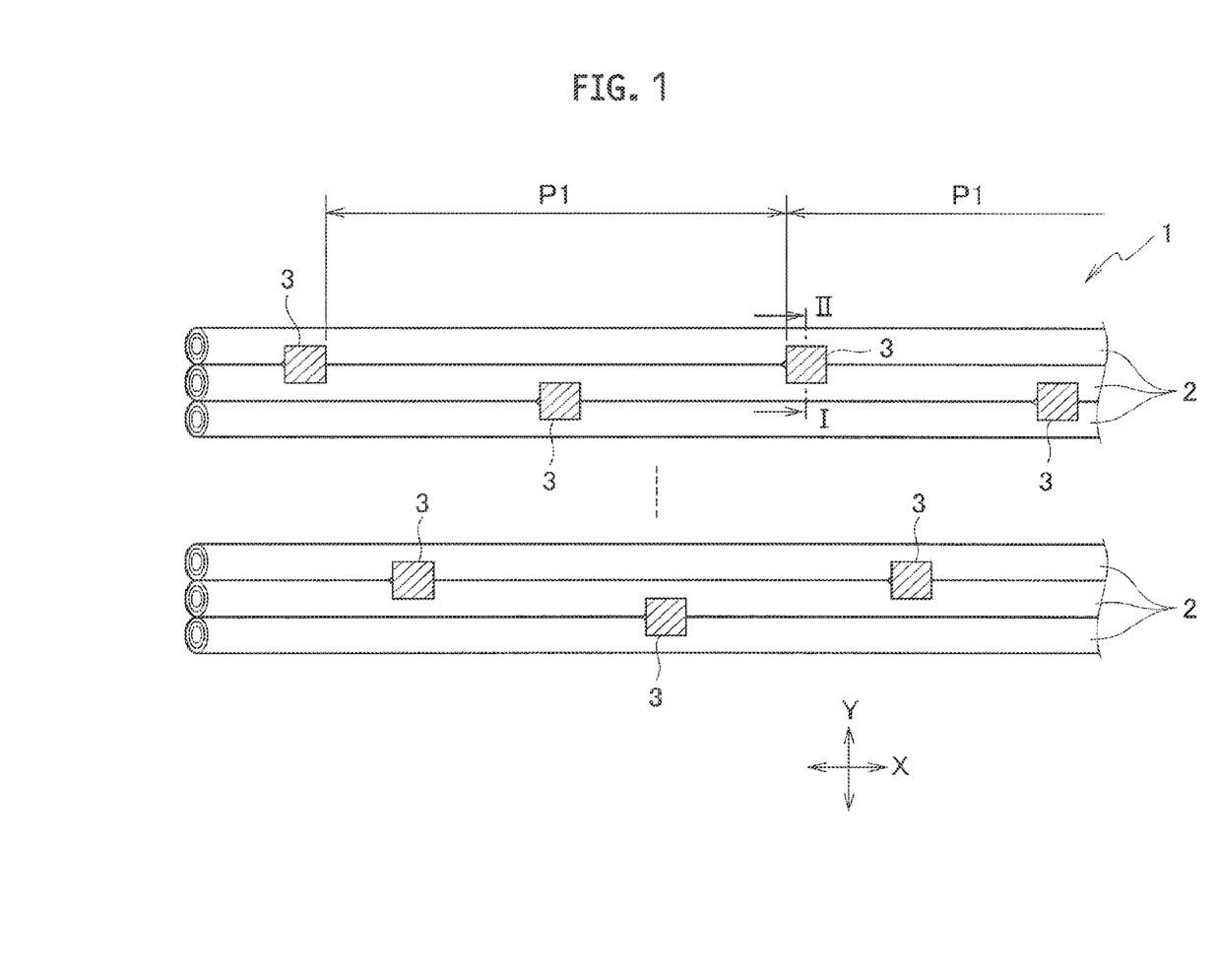
FIG. 1 is a top perspective view showing an example of an optical fiber ribbon having an intermittent fixing structure according to the present embodiment.
Figure 2:
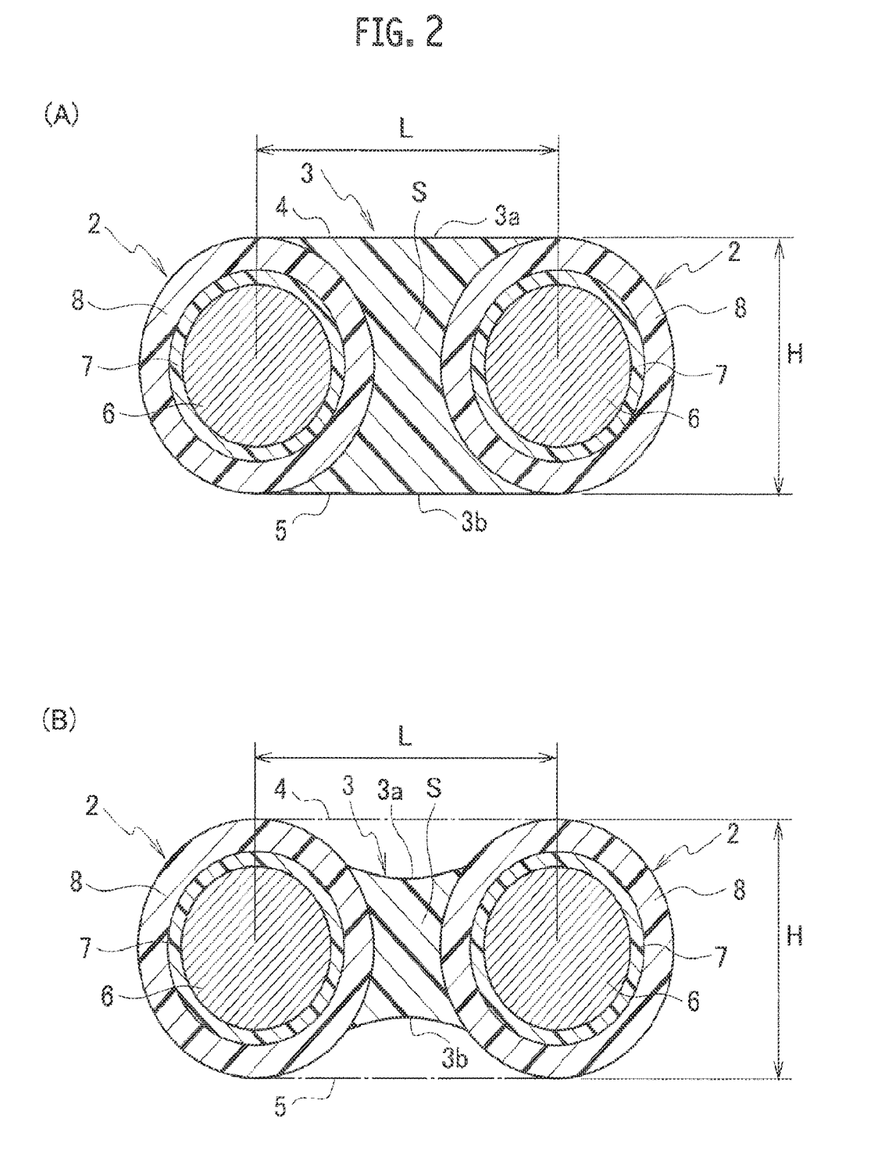
FIG. 2 is an enlarged cross-sectional view of a connecting portion of the optical fiber ribbon of FIG. 1.

FIG. 1 shows an example of an optical fiber ribbon having an intermittent fixing structure according to the present embodiment, and FIG. 2 shows an enlarged cross section of a connecting portion of the optical fiber ribbon of FIG. 1. As shown in FIG. 1, the optical fiber ribbon 1 according to the present embodiment has a structure in which three or more of optical fibers 2 are arranged in parallel, the adjacent two optical fibers 2 are connected together via connecting portions 3, and the connecting portions 3 are intermittently located in each of a ribbon longitudinal direction (in the X-arrow direction in FIG. 1) and a ribbon width direction (in the Y-arrow direction in FIG. 1).

As shown in FIG. 1, the optical fiber ribbon 1 is composed of the n optical fibers 2 in total, and the adjacent two optical fibers 2 of the n optical fibers 2 are intermittently connected together via the connecting portions 3 in each of the ribbon longitudinal direction and the ribbon width direction. The connecting portions 3 connecting the adjacent two optical fibers 2 together are formed in the ribbon longitudinal direction at a fixed pitch P1, and have a shorter length than unconnected portions each locate therebetween. Namely, the length of each connecting portion 3 is shorter than that of each unconnected portion in the ribbon longitudinal direction.

Further, only one connecting portion 3 is formed in the ribbon width direction to connect the adjacent two optical fibers 2. The connecting portion 3 is not located on the same line in the ribbon width direction as the other connecting portion 3 connecting other adjacent two optical fibers 2 but located in the offset position from the other connecting portion 3 in the ribbon longitudinal direction. Therefore, the connecting portions 3 formed in the optical fiber ribbon 1 are arranged in a zigzag manner as a whole. Note that the arrangement of the connecting portions 3 is not limited to that shown in FIG. 1 and may be other configurations. The arrangement shown in FIG. 1 is merely an example. Here, in addition, to the arrangement in which only one connecting portion 3 is provided in the ribbon width direction, two or more connecting portions 3 may be formed in the ribbon width direction in a manner such that at least one unconnected portion is located between the connecting portions 3.

As shown in FIG. 2(A), the connecting portion 3 connects the adjacent two optical fibers 2 together in such a manner as to fill the gap S between the adjacent two optical fibers 2 with resin (for example, ultraviolet curable resin) and then cure it. Both surfaces 3a and 3b of the connecting portion 3 are respectively positioned on the same lines as lines 4 and 5 each connecting the contact points of the respective optical fibers 2 when being placed on the horizontal surface. Therefore, the inner half circumferences of the optical fibers 2 facing the gap S are covered with the resin composing the connecting portion 3, but the outer half circumferences on the opposite side of the gap S are not covered with the resin.

The two surfaces 3a and 3b of the connecting portion 3 shown in FIG. 2(B) are each formed into a recess having a concave shape curved toward the center of the gap S to separate from the lines 4 and 5 each connecting the contact points of the respective optical fibers 2 when being placed on the horizontal surface. In FIG. 2(B), the amount of the resin composing the connecting portion 3 is smaller than that in FIG. 2(A), and the resin is locally concentrated in the central portion of the gap S between the two optical fibers 2. The optical fiber ribbon connected with the connecting portions 3 having such a configuration is more easily bent since the amount of the resin used is smaller than that of the connecting portion 3 shown in FIG. 2(A), so that the number of the optical fiber ribbons to be housed in a cable further increases.

Each of the optical fibers 2 includes a bare glass optical fiber 6 provided in the center thereof, a first cover layer 7 covering the periphery of the glass optical fiber 6, and a second cover layer 8 further covering the periphery of the first cover layer 7. The glass optical fiber 6 has a diameter of 125 µm. The first cover layer 7 is a relatively soft resin layer to absorb lateral pressure applied to the glass. The second cover layer 8 is a relatively hard resin layer to protect against external damage. The second cover layer 8 may be further covered with a colored layer so that the respective optical fibers 2 can be discriminated therebetween. The colored layer is formed as an outermost layer so as to easily differentiate the respective optical fibers 2 visually.

According to the present embodiment, the outer diameter dimension of the optical fibers 2 (the entire diameter including the outermost layer) H is set to smaller than or equal to 220 µm, and the distance L between the centers of the adjacent two optical fibers 2 is set to 250±30 µm. The optical fiber 2 of the present embodiment is a size smaller than the optical fiber 2 conventionally used which has the outer diameter dimension H of 250 μm. In addition, the distance L between the centers of the adjacent two optical fibers in the optical fiber ribbon conventionally used is 250 μm. The present embodiment sets the distance L to 250 μm with a margin of plus or minus 30 μm.

The connecting portion 3 shown in FIG. 2(A) has a thickness which is the same as the outer diameter dimension H of the optical fibers 2. The connecting portion 3 shown in FIG. 2(B) has a thickness which is smaller than the outer diameter dimension H of the optical fibers 2.

The optical fiber ribbon 1 has an intermittent fixing structure in which the connecting portions 3 are intermittently provided in each of the ribbon longitudinal direction and the ribbon width direction to connect the adjacent two optical fibers 2 together, and has a configuration in which the optical fibers 2 have the outer diameter dimension H of smaller than or equal to 220 μm which is smaller than that of the conventionally-used optical fibers, which contributes to decreasing the diameter of the optical fibers 2 and easily bending the ribbon. As a result, a larger number of the optical fiber ribbons 1 can be housed in a cable compared with optical fiber ribbons having conventional structure so as to increase the packaging density thereof.

Further, since the optical fiber ribbon according to the present embodiment has a configuration in which the optical fibers 2 have the outer diameter dimension H of smaller than or equal to 220 μm which is smaller than that of the conventionally-used optical fibers, the volume of the optical fibers can be reduced by 20% or greater compared with the optical fibers having a conventional configuration. Accordingly, the entire diameter of the optical fiber ribbon can be decreased so as to further increase the packaging density thereof.

Figure 3:
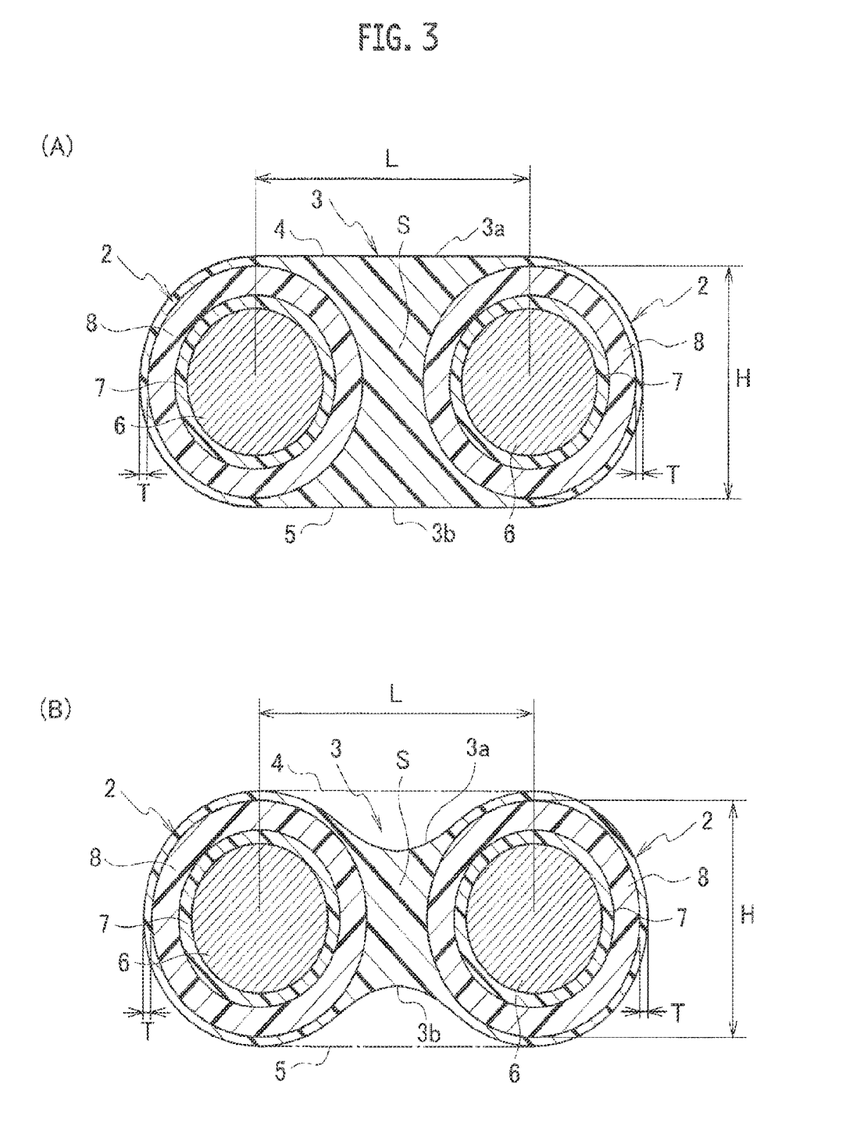
FIG. 3 is an enlarged cross-sectional view of a connecting portion of the optical fiber ribbon having another structure of FIG. 1.

It should be noted that the connecting portions 3 are not limited to the configurations shown in FIG. 2(A) and FIG. 2(B) in which the connecting portions 3 are formed only in the gap S between the adjacent two optical fibers 2, but may have the configurations shown in FIG. 3(A) and FIG. 3(B). The connecting portions 3 shown in FIG. 3 are formed in such a manner as to fill resin into the gap S between the adjacent two optical fibers 2 and cover the peripheries of the optical fibers 2 with the resin. The resin thickness T on the outer half circumference of each optical fiber 2 covered with the connecting portion 3 is set to smaller than or equal to 15 μm.

The example shown in FIG. 3, in which the outer half circumference of each optical fiber 2 having the outer diameter dimension of 220 μm is covered with the resin, has no influence on the bending performance of the optical fiber ribbon 1 since the resin thickness T of the resin covering the outer half circumference is as thin as 15 μm or smaller. Therefore, such a configuration does not prevent from improving the packaging density in the cable.

Example

Several types of optical fibers having different outer diameter dimensions were used in which the distance between the centers of adjacent optical fibers varied, so as to manufacture optical fiber ribbons (4-core ribbons). The manufacture of connecting portions and unconnected portions employed the method disclosed in Japanese Unexamined Patent Application Publication No. 2010-033010 (Japanese Patent Application No. 2009-082778). The pitch adjustment between the optical fibers employed the method disclosed in Japanese Unexamined Patent Application Publication No. 08-146239 (Japanese Patent Application No. 06-163292). Note that all optical fibers in one optical fiber ribbon have the same outer diameter dimension.

Next, batch fusion splicing performance was evaluated when one optical fiber ribbon thus obtained was entirely fused with the other optical fiber ribbon. The operation process was as follows. First, the optical fiber ribbon was held with a holder, the first cover layers 7 and the second cover layers 8 covering the respective optical fibers were removed by use of Hot Jacket Stripper to obtain the bare glass optical fibers 6, and side surfaces of the bare glass optical fibers 6 thus obtained were cut with a fiber cutter. Subsequently, the respective glass optical fibers 6 in the optical fiber ribbon held with the holder were placed on a fusion machine 10 having V-shaped grooves 9 formed at a fixed pitch P2 shown in FIG. 4. In this state, the evaluation was performed in such a manner as to determine whether the respective glass optical fibers 6 were placed in the corresponding V-shaped grooves 9. The case where the glass optical fibers 6 were placed in the V-shaped grooves 9 was defined as OK, and the case where the glass optical fibers 6 deviated from the V-shaped grooves 9 was defined as NG.

Figure 4:
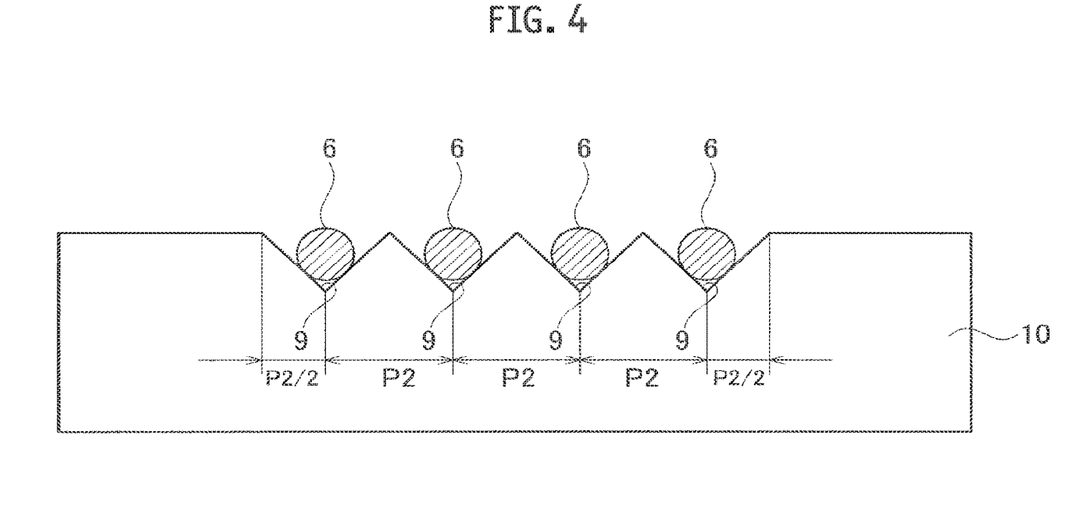
FIG. 4 is a view showing a state where glass optical fibers in the optical fiber ribbon according to the present embodiment from which covering is removed, are placed in V-shaped grooves of a fusion machine.

Hot Jacket Stripper used was HJS-02 manufactured by Fujikura Ltd. The fiber cutter used was CT-30 manufactured by Fujikura Ltd. The fusion machine used was FSM-60R also manufactured by Fujikura Ltd. The pitch P2 between the respective V-shaped grooves 9 in the fusion machine 10 is 250 μm. The operation under the conditions described above was repeated 10 times and the number of NG was then counted. Table 1 shows the evaluation thereof.

TABLE 1

| Outer Diameter of Optical Fiber (μm) | Distance between Centers of Adjacent Optical Fibers (μm) | Number of NG in Batch Fusion Splicing Performance |
|---|---|---|
| 220 | 300 | 8 |
| 220 | 280 | 0 |
| 220 | 250 | 0 |
| 220 | 230 | 0 |
| 200 | 280 | 0 |
| 200 | 250 | 0 |
| 200 | 220 | 0 |
| 180 | 300 | 6 |
| 180 | 280 | 0 |
| 180 | 250 | 0 |
| 180 | 220 | 0 |
| 180 | 200 | 4 |

The results shown in Table 1 revealed that, when the distance L between the centers of the adjacent optical fibers 2 of the optical fiber ribbon 1 having an intermittent fixing structure is set to 250±30 μm (220 μm to 280 μm), the glass optical fibers 6 do not deviate from the V-shaped grooves 9 so as to be concurrently fused with the corresponding glass optical fibers of the other optical fiber ribbon. The number of NG increased when the optical fiber ribbon did not meet the above-described condition, and the glass optical fibers 6 could not be placed in the V-shaped grooves 9 precisely.

[Optical Fiber Cable]

Figure 5:
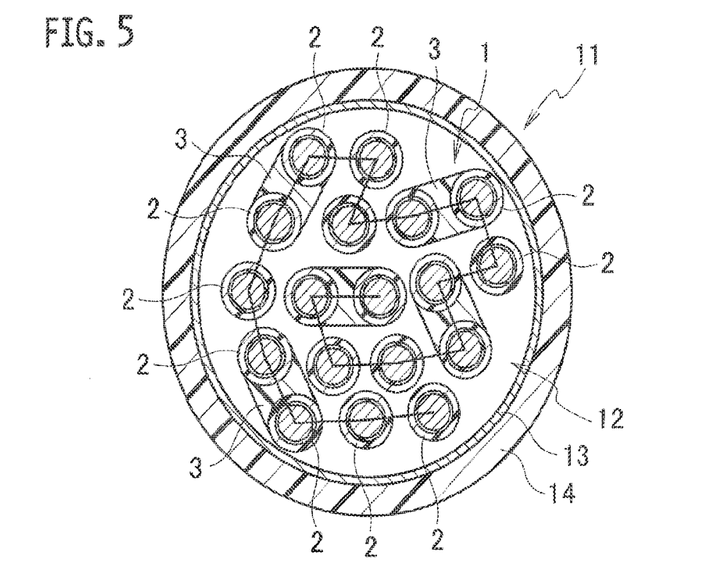
FIG. 5 is a cross-sectional view of a center tube-type optical fiber cable housing the optical fiber ribbon according to the present embodiment therein.

FIG. 5 shows an example of a center tube-type optical fiber cable housing the optical fiber ribbon according to the present embodiment therein. The center tube-type optical fiber cable 11 has a configuration in which the optical fiber ribbon 1 of the present embodiment is formed into a cable core 12 in a manner such that the optical fibers 2 are rolled in the ribbon width direction and assembled into a bundle as indicated by a dashed and double-dotted line in FIG. 5, thermoplastic resin is extruded over the periphery of the cable core 12 thus obtained so as to form a tube 13 thereon, and the tube 13 is further covered with polyethylene so as to form a sheath 14 thereon.

Figure 6:
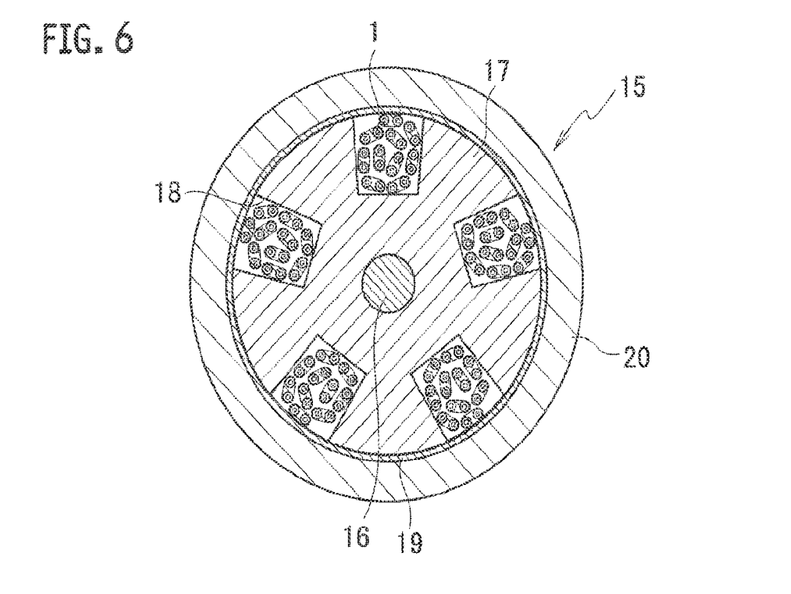
FIG. 6 is a cross-sectional view of an SZ-slotted optical fiber cable housing the optical fiber ribbon according to the present embodiment therein.

FIG. 6 shows an example of an SZ-slotted optical fiber cable housing the optical fiber ribbon according to the present embodiment therein. The SZ-slotted optical fiber cable 15 has a configuration in which a plurality of slots 18 having a U-shape in cross section are formed on the outer periphery of a slot core 17 including a tension member 16 in the center thereof extending in the ribbon longitudinal direction, the optical fiber ribbon 1 according to the present embodiment is rolled in the ribbon width direction into a bundle and housed in each of the slots 18, the peripheral surface of the slot core 17 including the openings of the slots 18 is covered with a press winding tape 19, and a sheath 20 is further formed thereon by extrusion.

Figure 7:
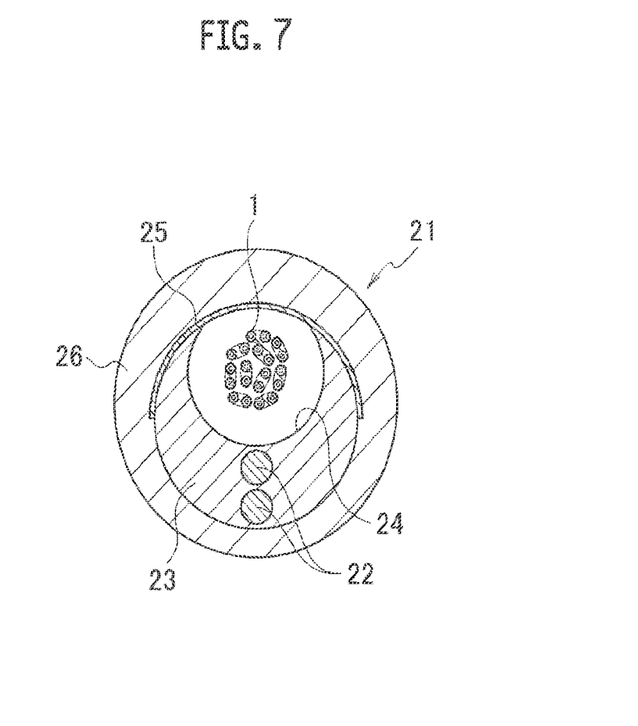
FIG. 7 is a cross-sectional view of a C-slotted optical fiber cable housing the optical fiber ribbon according to the present embodiment therein.

FIG. 7 shows an example of a C-slotted optical fiber cable housing the optical fiber ribbon according to the present embodiment therein. The C-slotted optical fiber cable 21 has a configuration in which the optical fiber ribbon 1 according to the present embodiment is rolled in the ribbon width direction into a bundle and housed in a slot groove 24 of a slot core 23 having a C-shape in cross section including tension members 22 therein, and the entire slot core is covered with a sheath 26 via a press winding tape 25 interposed therebetween.

Although the optical fiber ribbon 1 shown in each of FIG. 5, FIG. 6 and FIG. 7 according to the present embodiment is rolled in the ribbon width direction into a bundle and housed in the cable, the optical fiber ribbon 1 according to the present embodiment may be folded in layers in the vertical direction and housed in the cable. Alternatively, a plurality of the optical fiber ribbons 1 may be stacked on top of one another to have a stacked structure and then housed in the cable.

The optical fiber cables 11, 15 and 21 according to the present embodiment each use the optical fibers 2 having the reduced outer diameter dimension of smaller than or equal to 220 μm. Therefore, a larger number of the optical fibers 2 can be housed in the cable, compared with the conventionally-used optical fibers 2 having the outer diameter dimension of 250 μm, so as to ensure higher density. Further, the optical fiber cables 11, 15 and 21 according to the present embodiment can house the optical fiber ribbon 1 having an intermittent fixing structure in any state in a manner such that the optical fiber ribbon 1 is bent and rolled into a cylindrical shape or folded to be stacked in any direction.

Further, the optical fiber cables 11, 15 and 21 according to the present embodiment can easily separate the respective optical fibers 2 from each other so as to improve single-core separation workability at the time of terminal leading to extract the optical fibers 2 from the terminals of the cable or at the time of connecting operation to connect a connector to the extracted optical fibers 2, since the optical fiber cables 11, 15 and 21 each use the optical fiber ribbon 1 including the connecting portions 3 intermittently formed in each of the ribbon longitudinal direction and the ribbon width direction to connect the adjacent two optical fibers 2 together.

INDUSTRIAL APPLICABILITY

The present invention is applicable to the optical fiber ribbon having an intermittent fixing structure to intermittently connect the adjacent optical fibers together via the connecting portions.

What is claimed is:

1. An optical fiber ribbon, comprising:
   three or more optical fibers arranged in parallel, wherein each of the three or more optical fibers includes an outer layer made of resin and the resin has an outer diameter of less than or equal to 220 microns, wherein a gap is defined between each adjacent two optical fibers of the three or more optical fibers, and wherein a distance along a width direction between centers of the adjacent two optical fibers is in a range between 220 microns and 280 microns; and
   connecting portions filling resin into the gap between each adjacent two optical fibers and intermittently connecting the adjacent two optical fibers both in length and width directions of the adjacent two optical fibers;
   wherein at least one of the connecting portions has at least one outer surface which is positioned on a line connecting contact points of the adjacent two optical fibers when placed on a horizontal surface.

2. The optical fiber ribbon of claim 1, wherein the at least one of the connecting portions has two opposing outer surfaces, each of which is positioned on a line connecting contact points of the adjacent two optical fibers when placed on a horizontal surface.

3. The optical fiber ribbon of claim 1, wherein each of the three or more optical fibers comprises a colored layer, the colored layer being an outermost layer of the optical fiber.

4. The optical fiber ribbon of claim 1, wherein a length of each connecting portion is less than a length of each neighboring unconnected portion along the length direction.

5. The optical fiber ribbon of claim 1, wherein each of the connecting portions are not located on the same line in the optical fiber ribbon width direction as any other connecting portions connecting other adjacent two optical fibers, and wherein each of the connecting portions is offset from the other connecting portions in the optical fiber ribbon longitudinal direction.

6. The optical fiber ribbon of claim 1, wherein the optical fiber ribbon is rolled in the ribbon width direction or folded in the ribbon width direction.

7. An optical fiber cable comprising the optical fiber ribbon of claim 1.

8. The optical fiber cable of claim 7, wherein the optical fiber ribbon is rolled in the ribbon width direction or folded in the ribbon width direction.

9. A batch of optical fiber cables including at least 100 optical fiber cables, each optical fiber cable comprising:
   an optical fiber ribbon comprising:
      three or more optical fibers arranged in parallel, wherein a gap is defined between each adjacent two optical fibers of the three or more optical fibers, wherein each of the three or more optical fibers has an outer diameter of less than or equal to 220 microns, and wherein a distance along the width direction between centers of the adjacent two optical fibers is 250 microns with a margin of plus or minus 30 microns;
      connecting portions filling resin into the gap between each adjacent two optical fibers and intermittently connecting the adjacent two optical fibers both in length and width directions of the adjacent two optical fibers;
      wherein at least one of the connecting portions has at least one outer surface which is positioned on a line connecting contact points of the adjacent two optical fibers when placed on a horizontal surface.

10. The batch of optical fiber cables of claim 9, wherein the at least one of the connecting portions has two opposing outer surfaces, each of which is positioned on a line connecting contact points of the adjacent two optical fibers when placed on a horizontal surface.

11. The batch of optical fiber cables of claim 9, wherein each of the three or more optical fibers comprises a colored layer, the colored layer being an outermost layer of the optical fiber.

12. The batch of optical fiber cables of claim 9, wherein a length of each connecting portion is less than a length of each neighboring unconnected portion along the length direction.

13. The batch of optical fiber cables of claim 9, wherein each of the connecting portions are not located on the same line in the optical fiber ribbon width direction as any other connecting portions connecting other adjacent two optical fibers, and wherein each of the connecting portions is offset from the other connecting portions in the optical fiber ribbon longitudinal direction.

14. The batch of optical fiber cables of claim 9, wherein the optical fiber ribbon is rolled in the ribbon width direction or folded in the ribbon width direction.

* * * * *